United States Patent [19]

Hammond

[11] 4,044,876
[45] Aug. 30, 1977

[54] FAIL-SAFE GRAVITY CONVEYOR

[76] Inventor: Theodore A. Hammond, 3575 52nd St., S.E., Kentwood, Mich. 49508

[21] Appl. No.: 682,051

[22] Filed: Apr. 30, 1976

[51] Int. Cl.² ............................................. B65G 13/00
[52] U.S. Cl. ................................................ 193/35 SS
[58] Field of Search ............... 193/35 R, 35 A, 35 SS, 193/37; 198/783, 790, 855; 104/135; 214/84

[56] References Cited

U.S. PATENT DOCUMENTS

| | | | |
|---|---|---|---|
| 2,979,177 | 4/1961 | Sullivan | 193/35 A |
| 3,108,671 | 10/1963 | Fuka et al. | 193/35 A |
| 3,130,829 | 4/1964 | Long | 193/35 SS |
| 3,724,642 | 4/1973 | De Good | 198/781 |
| 3,860,106 | 1/1975 | Cooley | 198/781 |
| Re. 22,843 | 2/1947 | Porter | 193/35 SS |

*Primary Examiner*—Evon C. Blunk
*Assistant Examiner*—James L. Rowland
*Attorney, Agent, or Firm*—Blanchard, Flynn, Thiel, Boutell & Tanis

[57] ABSTRACT

A gravity-type roller conveyor having a plurality of rollers rotatably supported by axles which extend substantially horizontally. The axles are supported at one end thereof by a support device which extends longitudinally along one side of the conveyor and permits the axles, and hence the rollers, to pivot vertically through a small angle about said one side of the conveyor. An actuating device is disposed adjacent and extends longitudinally along the other side of the conveyor, which actuating device supports the other ends of the axles thereon for vertically lifting and lowering these ends through a limited extent, thereby causing the axles and hence the rollers to pivot about said one end. The actuating device includes an elongated intermediate support member extending longitudinally along the conveyor and having the other ends of the axles positioned thereon, which intermediate support member in turn is positioned on a pulsating actuating member, particularly an inflatable elongated hose. The hose is supplied with pressurized fluid, particularly air, in a pulsating manner to cause periodic and intermittent raising and lowering of the intermediate support member, and hence of the rollers. An elongated stationary brake member is positioned below the rollers adjacent said other ends of the axles, which brake member extends longitudinally of the conveyor and frictionally engages the rollers to positively stop same when the intermediate support member is periodically moved into its lowered position.

12 Claims, 4 Drawing Figures

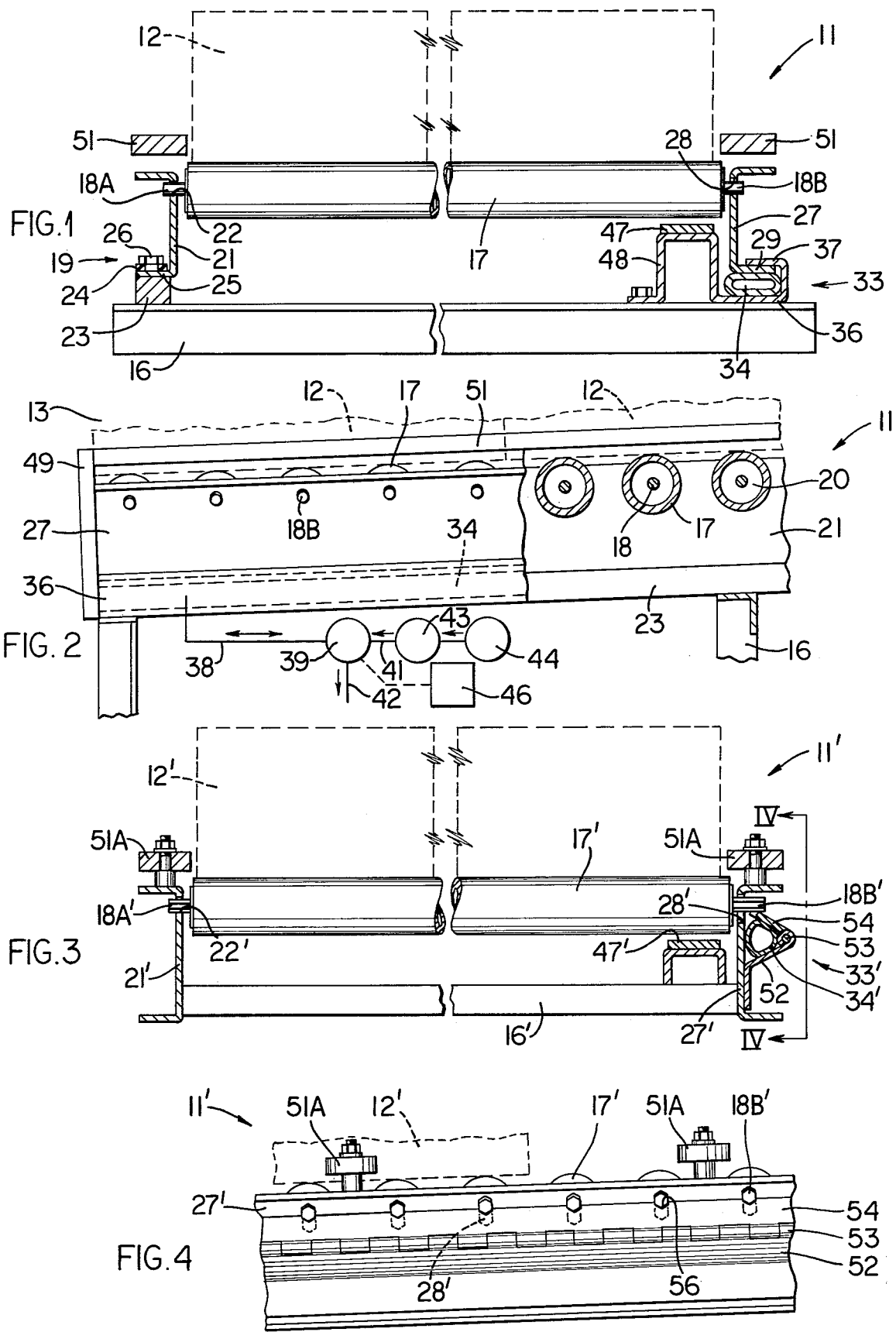

FAIL-SAFE GRAVITY CONVEYOR

FIELD OF THE INVENTION

This invention relates to an inclined gravity-type roller conveyor having fail-safe means associated therewith for controlling the rate of movement of the articles conveyed therealong.

BACKGROUND OF THE INVENTION

Articles conveyed on an inclined gravity-type roller conveyor over a substantial distance and slope accelerate as they advance along the conveyor and may attain a substantial velocity at the end of their traverse. The high velocity of the articles being conveyed is objectionable in that it presents various problems, such as the difficulty of stopping the articles, the damaging of the articles by impact with one another, and the tipping of the articles especially if they are relatively tall.

In an attempt to overcome the above problem, numerous gravity-type conveyors utilizing intermittently actuated brakes have been devised. However, to the best of Applicant's knowledge, none of these systems have been highly successful in view of the disadvantages which result therefrom, the primary one of which is that the system is not fail-safe.

One known gravity-type roller conveyor employing an intermittently actuated brake utilizes a plurality of rubber support rollers, which rollers have internal brakes associated therewith for intermittently stopping the rollers. However, experience with this type of conveyor has indicated that successful control of the rollers can be achieved only when the operating conditions are precisely conrolled. When substantial temperature variations occur, such as occurs between summer and winter weather conditions, it has been found that the brakes do not always stop the rollers and thus proper control of the rollers, namely intermittent braking thereof, does not always result.

Another known roller conveyor has been developed which utilizes an elongated brake member positioned below the rollers and moved upwardly by inflations of a flexible hose for engaging the rollers for periodically braking same. In this manner, the rotation of the rollers and the advance of the articles along the conveyor is thus controlled. While this system is at least partially effective for controlling the rate of movement of the articles, nevertheless this system does possess several structural and operational features which has made its use less than satisfactory. Particularly, in this known system, the brake is applied to the rollers only when the hose is inflated or pressurized. Accordingly, when a failure in the inflating system or hose occurs, the brakes cannot be applied so that movement of the articles along the conveyor is uncontrolled. This thus results in the numerous undesirable effects which have been discussed above.

A further disadvantage of this known system results from the fact that the braking force as applied to the rollers is determined solely by the pressure developed within the hose and by the relative clearances and distortions which occur throughout the system. The system clearances, distortions and hose pressure thus must be controlled rather precisely in order to result in the desired magnitude of braking of the rollers. This known system also is structurally complex since the hose and elongted brake member are positioned between an elongated stationary frame member and the plurality of roller, which rollers in turn are rotatably supported on the stationary frame. Access to the braking member and the hose, as for purposes of maintenance, is thus difficult.

The gravity-type roller conveyor disclosed in my copending application Ser. No. 567 608 does provide for desired conrol over the rate of movement along the conveyor, while at the same time overcoming the above-mentioned undesired structural and operational features of the known systems. The conveyor of this copending application is highly desirable since it permits a conrolled intermittent movement of articles along a gravity-type roller conveyor, which conveyor does not utilize an intermittently actuated brake, but rather utilizes an intermittently actuated roller system coacting with a stationary brake.

While the conveyor of my copending application has proven to operate in a highly successful and desirable manner, nevertheless experience has indicated that further improvements and simplifications can be made therein which permit the overall structure and operation of the conveyor to be substantially simplified, thereby minimizing both the cost of manufacturing and assembling the conveyor, and at the same time minimizing the required maintenance while substantially improving dependability.

Accordingly, the present invention relates to an improved gravity-type roller conveyor which not only incorporates the desirable features disclosed in my above-mentioned copending application, but also incorporates additional structural and operational features which still further improve the structural and operational characteristics of the conveyor. Particularly, the improved conveyor of this invention utilizes a periodic and intermittent actuator disposed along only one side of the conveyor so that the rollers of the conveyor thus undergo a limited vertical pivoting with respect to the other side of the conveyor. When the rollers are pivoted downwardly into their lowermost position, such as when the actuating device is in its lowermost position, the rollers are moved directly into engagement with a brake for stopping the rollers. The actuating device in this improved conveyor preferably utilizes an inflatable hose which is positioned along said one side of the conveyor and, when inflated, causes lifting of the rollers to permit conveying of articles therealong, whereby the conveyor thus retains a fail-safe operation so that deflation of the hose will automatically lower the rollers against the brake to stop the roller rotation and hence stop the articles.

Another object of the present invention is that it does not require the use of slave pallets or other specially designed pallets.

Other objects and purposes of this invention will be apparent to persons familiar with structures of this type upon reading the following specification and inspecting the accompanying drawings.

BRIEF DESCRIPTION OF THE DRAWINGS

FIG. 1 is a broken, sectional, elevational view of a roller conveyor according to this invention.

FIG. 2 is a fragmentary side view, partially in section, of the conveyor shown in FIG. 1.

FIG. 3 is a sectional view similar to FIG. 1 but illustrating a variation of the invention.

FIG. 4 is a fragmentary view taken substantially along the line IV—IV in FIG. 3.

Certain terminology will be used in the following description for convenience in reference only and will not be limiting. For example, the words "rightwardly," "leftwardly," "upwardly" and "downwardly" will refer to directions in the drawings to which reference is made. The word "forwardly" will refer to the normal direction of travel of articles along the conveyor, which direction is leftwardly in FIGS. 2 and 4. The words "inwardly" will refer to directions toward and away from, respectively, the geometric center of the conveyor and designated parts thereof. Said terminology will include the words above mentioned, derivatives thereof and words of similar import.

DETAILED DESCRIPTION

FIGS. 1 and 2 illustrate therein an inclined gravity-type roller conveyor 11 adapted for transporting articles 12 from an inlet or supply point located adjacent the upper end of the conveyor (the rightward end in FIG. 2) to a discharge point or station 13 at the lower end of the conveyor. The conveyor is disposed at a slight angle relative to the horizontal, which angle is normally between 2° and 10° but may exceed this latter angle under some use situations.

Conveyor 11 includes a stationary frame 16 supporting thereon a plurality of elongated cylindrical rollers 17, which rollers are rotatably supported by anti-friction bearings 20 on substantially horizontally extending axles 18. The rollers 17 are positioned serially along the frame and have their rotational axes positioned substantially parallel with one another, which axes are defined by the axles 18 and extend substantially horizontally.

The support axles 18, and hence the rollers 17, are supported along one side of the conveyor by a support structure 19. This structure 19 includes a sidewardly opening channel 21 which extends longitudinally of the conveyor and has openings 22 formed in the web thereof, which openings accommodate the projecting ends 18A of axles 18. The lower leg 25 of channel 21 is supported on an elongated rail 23 which is fixed to the frame 16 and extends longitudinally of the conveyor. The channel 21 is connected to the rail 23 by conventional threaded fasteners 26 so as to prevent separation therebetween. Resilient washers 24 are disposed under the heads of the fasteners 26 to permit the channel 21 to effectively rock or pivot relative to the rail 23.

The other ends 18B of roller axles 18 are supported on a similar support structure which includes a sidewardly opening channel 27 which is substantially identical to the channel 21. Openings 28 are formed in the web of channel 27 so as to receive therein the projecting axle ends 18B.

The lower leg 29 of channel 27 is associated with an actuating device 33 which is periodically actuated in a repetitive manner so as to cause the rightward ends of the rollers 17 to be raised and lowered. For this purpose, the actuating device 33 includes an elongated flexible hose 34, such as conventional fire hose, positioned within an upwardly opening guide channel 36. The guide channel 36 is secured to the frame 16 and extends longitudinally of the conveyor along one side thereof. The flexible hose 34 is disposed within this guide channel, and the hose in turn has the lower leg 29 of the channel 27 disposed on the upper side thereof substantially as shown in FIG. 1. The guide channel 36 also has a stop flange 37 which projects inwardly and overlaps the lower leg 29 to thereby limit the upward displacement of the channel 27, and hence the upward displacement of the rollers 17, when the hose 34 is inflated.

The flexible hose 34 is alternatively expanded and contracted by means of a pressure fluid being supplied thereto, such as pressurized air. For this purpose, a conduit or pipe 38 is connected to the hose 34 for both supplying and withdrawing the pressurized fluid to or from the interior thereof. The flow of fluid through conduit 38 is controlled by a conventional shiftable valve 39 which may comprise a conventional three-way valve, which valve is in turn controlled in its shifting movement by means of a conventional control device 46, which latter device may be of any conventional construction such as a timer-controlled cammed device or the like. An inlet conduit 41 is connected to the valve 39 for permitting the flow of pressure fluid therethrough into the conduit 38. This inlet conduit 41 is in turn connected to an accumulator 43 of conventional construction, which accumulator contains therein pressurized fluid, such as air, supplied from a conventional power source, such as a compressor 44. The valve 39 also permits the main conduit 38 to be interconnected to a suitable discharge conduit 42, which discharge conduit may freely open into the atmosphere when the pressurized fluid constitutes air.

The conveyor 11 also includes an elongated striplike brake member 47 positioned beneath the swingable rollers 17 adjacent one end thereof. This brake member 47 is positioned closely adjacent the channel 27 and, as shown in FIG. 1, is supported on an elongated inverted channel-like support rail 48, which rail is fixed with respect to the frame 16 and extends longitudinally of the conveyor. The support rail 48 is, in the illustrated embodiment, integral with the guide channel 36.

Conveyor 11 may include a pair of elongated guide rails 51 extending longitudinally thereof and positioned adjacent opposite sides of the conveyor. These guide rails are disposed closely adjacent to, but spaced slightly upwardly from, the opposite ends of the rollers 17 so as to closely guidably confine the articles 12 as they are transported along the conveyor. Preferably, however, rails 51 are replaced by guide rollers 51A (FIG. 3) which are rotatably supported on the upper leg of channel 21 at spaced intervals therealong for confining the loads or pallets 12.

While not clearly shown in the drawings, it will be understood that the openings 22 and 28 are preferably slightly oversized relative to the axle ends to prevent undesired binding or twisting during the vertical swinging of the rollers.

OPERATION

In operation, the hose 34 is alternately and intermittently expanded and contracted to thereby raise and lower the rightward ends of the rollers 17, and thereby permit an intermittent steplike movement of the articles 12 downwardly along the conveyor.

When the valve 39 is opened to provide communication between the main conduit 38 and the inlet conduit 41, pressurized fluid is supplied to the hose 34 so as to expand same, thereby raising the channel 27 upwardly until limited by the stop flange 37. This thus positions the rightward ends of the rollers 17 in their uppermost position, substantially as shown in FIG. 1, in which position the rollers are spaced upwardly and hence maintained out of engagement with the brake member 47. In this condition, the rollers 17 are thus freely rotatable so that the articles 12 will freely move downwardly along the conveyor due to the urging of gravity.

When the hose 34 is inflated so as to move the rightward ends of the rollers upwardly into the uppermost position shown in FIG. 1, as described above, the elevation of the leftward ends of the rollers 17 does not undergo any appreciable change. Rather, the rollers 17 undergo a vertical pivoting movement which occurs about a pivot axis disposed adjacent and extending longitudinally along the leftward side of the conveyor. This pivoting movement is possible due to the connection provided between the channel 21 and the rail 23, so that as the hose 34 raises the rightward ends of the rollers 17, the channel 21 rocks relative to the rail 23.

On the other hand, when the valve 39 is shifted into a position wherein the main conduit 38 is connected to the discharge conduit 42, then the hose 34 is at least partially deflated, whereupon the weight of the cylindrical rollers 17 and of the articles 12 thereon causes the channel 27 and hence the rightward ends of the rollers 17 to move downwardly from the position shown in FIG. 1. The rightward ends of rollers 17 move downwardly a sufficient extent until they engage the upper surface of the brake member 47, which brake member directly engages the rotatable rollers 17 and thus rapidly bring them to a stop. This stoppage of the rollers also results in a corresponding stoppage of the articles 12 being transported along the conveyor. The brake member 47 is preferably of a conventional brake material having a high-friction characteristic, several such materials being well known and commercially available.

When the rightward ends of the rollers 17 are disposed in engagement with the brake member 47, then the rotational axes of these rollers is normally slightly inclined downwardly with respect to the horizontal so that the rightward ends of the rollers are thus positioned slightly below the leftward ends of the rollers. On the other hand, when the rollers are in their conveying position, namely the upper position as shown in FIG. 1, then the rotational axis normally extend either substantially horizontally or are inclined slightly upwardly from the horizontal so that the rightward ends are at an elevation slightly above the leftward ends. However, the angular displacement of the rollers between the raised conveying position (FIG. 1) and the lowered braking position is normally no more than 2° and is preferably less than ½°. This small angular displacement, coupled with the fact that it occurs on opposite sides of the horizontal plane, thus exerts no significant influence on the articles so that they are able to track properly as they are intermittently moved downwardly along the conveyor. The above-mentioned small angular displacement occurs due to the rightward ends of rollers 17 being vertically displaced a maximum of about one-fourth inch, and preferably about one-eighth inch.

The control device 46 causes a periodic back-and-forth shifting of the valve 39 so as to thereby intermittently couple the main conduit 38 to the supply conduit 41 and discharge conduit 42 at a selected frequency. This results in hose 34 being alternately and intermittently expanded and contracted at the selected frequency, which in turn causes the rightward ends of rollers 17 being alternately and intermittently raised and lowered in a periodic manner. When the rollers 17 are pivoted upwardly into the position of FIG. 1, the articles are freely conveyed downwardly along the conveyor due to the effect of gravity. On the other hand, during the intervals when the valve 39 is connected to the discharge conduit 42 so as to cause the rollers to be pivoted downwardly into engagement with the brake member 47, then the rollers 17 are held stationary and the articles 12 are likewise maintained stationary. Thus, due to the control exercised by the control device 46, the rollers 17 are intermittently and periodically pivoted upwardly and downwardly, with the rollers being maintained in the raised and lowered positions for preselected time intervals as controlled by the control device 46. Due to this mode of operation, the articles 12 are thus moved in an intermittent steplike manner from the inlet end of the conveyor toward the discharge end thereof. When reaching the discharge end of the conveyor, the articles engage a stop 49 which prevents any further movement of the articles, which articles are then suitably removed from the conveyor in any conventional manner, such as by a forklift. This conveyor is particularly desirable since it permits articles to be stored directly on the conveyor at the lower end thereof, which articles are maintained in abutting engagement with one another, and with the frontmost or lowermost article being engaged with the stop 49. When the frontmost article is removed from the conveyor, then this arrangement permits the remaining articles to be automatically and intermittently advanced until the next article engages the stop. This thus permits the articles to be handled on a "first in - first out" basis, while at the same time permitting simple storage of the articles on the conveyor for any desired period of time.

Due to the manner in which the articles are moved in an intermittent steplike manner along the conveyor, the speed of the articles can thus be precisely controlled so that there is very little possibility of large and heavy articles gaining sufficient momentum as to effectively "run away" and thereby cause severe damage to either the articles, the equipment or the operating personnel. Since the rollers 17 are intermittently braked on a regular yet intermittent pattern, which pattern is selected by means of the timing of the control device 46, this thus permits maximum control over the movement of the articles. At the same time, if the conveyor system should undergo a failure, such as due to a breakage in either the hose or in the air supply system, then the hose will deflate and lower the rightward ends of the rollers onto the brake member, thereby stopping and effectively shutting down the conveyor, and thus preventing the loads from running away. The conveyor thus functions as a fail-safe system.

MODIFICATIONS

FIGS. 3 and 4 illustrate therein a modified conveyor which incorporates much of the same structure illustrated in FIGS. 1 and 2, so that the structure of FIGS. 3 and 4 utilizes the same reference numerals but with the addition of a prime (') thereto. The conveyor of FIGS. 3 and 4 does, however, utilize a modified actuating device 33'.

As shown in FIGS. 3 and 4, the side channels 21' and 27' are each fixedly secured to the frame 16' and extend longitudinally of the conveyor along the sides thereof. These side channels support thereon the opposite ends 18A' and 18B' of the roller axles. The cylindrical rollers 17' are rotatably supported on the respective axles by conventional anti-friction bearings (not shown) disposed therebetween. The projecting ends of the axles are, in the illustrated embodiment, provided with a non-circular cross-section, the ends of the axles being shown with hexagonal cross-sections in FIGS. 3 and 4. The leftward ends 18A' of the axles extend through openings 22' formed in the channel 21', which openings are sufficiently oversized at least in the vertical direction to permit the rollers 17' to vertically pivot about the leftward ends of the axles as supported on the web of channel 21'.

The rightward ends 18B' of the axles extend through openings 28' formed in the web of channel 27', which openings 28' are formed as vertically elongaged slots so as to permit the righward axle ends 18B' to move vertically through a limited extent. This permissible movement of the axles, as accommodated by the slots 28', accordingly permits the rollers 17' to undergo a limited pivotal movement within vertical planes.

Considering now the actuating device 33', same again includes a flexible hose 34' supported on a flange 52 which, as shown in FIG. 3, is fixed to the web of channel 27' and projects outwardly therefrom so that these members effectively form a V-shaped upwardly opening channel for confining the hose 34' therein. The free edge of flange 52 is hingedly connected, as by an elongated piano-type hinge 53, to one edge of an actuating plate 54. The actuating plate 54 rests on the upper surface of hose 34', and the upper free edge of plate 54 is disposed for engaging the lower sides of the projecting axle ends 18B'. As shown in FIG. 4, the free edge of the actuating plate 54 has small notches 56 therein in which are positioned the projecting axle ends 18B'.

In this variation, inflation of hose 34' causes the actuating plate 54 to swing upwardly about the hinge 53, which in turn lifts the rightward ends 18B' of the axles upwardly within the elongated slots 28' and hence lifts the rightward ends of the rollers 17' upwardly so as to be moved out of engagement with the brake member 47'. This upward movement of the rightward ends of rollers 17' occurs as a pivoting movement within vertical planes, which pivoting movement takes place about the leftward ends 18A' of the axles which leftward ends pivot within the openings 22' formed in the channel 21'. When the hose 34' is deflated, the actuating plate 54 swings downwardly so that the rollers are again lowered into braking engagement with the brake member 47'. Thus, the rollers 17' are periodically moved in an alternating and intermittent manner between a raised conveying position and a lowered braked position in substantially the same manner as described above with respect to the conveyor 11 of FIGS. 1 and 2.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a fail-safe, gravity-type roller conveyor for permitting intermittent controlled movement of articles therealong, comprising:

elongated frame means;

a plurality of elongated cylindrical roller means rotatably supported on said frame means, said roller means being disposed with their axes extending substantially horizontally and in spaced parallel relationship, said roller means having their upper surfaces disposed on a declining plane which extends at a small acute angle relative to the horizontal so as to permit said articles to move by gravity along said plurality of roller means;

braking means for controlling the gravity-induced movement speed of said articles along said plurality of roller means, said braking means being fixed relative to and extending longitudinally along said frame means;

support means extending longitudinally of said frame means along one side of said conveyor for supporting said plurality of roller means at one axial end thereof, said support means permitting angular displacement of said plurality of roller means in a vertical direction substantially about said one axial end;

lifting means coacting between said frame means and the other axial end of said plurality of roller means for causing intermittent and periodic vertical reciprocating movement of said other axial end of said plurality of roller means in a cyclic manner between a raised position permitting gravity-urged movement of the articles along said roller means and a lowered position wherein said articles are stopped by said braking means, said lifting means causing said roller means to effectively vertically pivot about said one axial end thereof as defined by said support means, said lifting means also causing said roller means to automatically move into said lowered position upon failure of said lifting means so that said braking means stop said articles;

said braking means being disposed beneath said roller means and positioned adjacent said other axial end of said roller means whereby said roller means, when moved into said lowered position, directly engage said braking means; and control means operatively interconnected to said lifting means for causing cyclic actuation thereof to cause said roller means to vertically pivot back-and-forth between said raised and lowered positions in a periodic and repetitive manner.

2. A conveyor according to claim 1, wherein an elongated member is disposed adjacent the other side of said conveyor and extends longitudinally of said frame means, said elongated member having said other axial end of said roller means supported thereon, and said lifting means including an elongated flexible conduit inflatable with a pressure fluid and positioned between said frame means and said elongated member, said elongated member being disposed in engagement with the upper side of said conduit, whereby inflation of said conduit causes said elongated member and said other axial end of said roller means to be moved upwardly so that the roller means are moved into said raised position, and whereby at least partial deflation of said conduit causes lowering of said elongated member and consequent movement of said roller means into said lowered position.

3. A conveyor according to claim 2, wherein said frame means includes an upwardly opening channel-like structure having said elongated flexible conduit disposed therein.

4. A conveyor according to claim 3, wherein said elongated member is disposed above and supported on said conduit so that said elongated member is raised and lowered in its entirety in response to inflation and deflation of said conduit, respectively, and wherein said other axial end of said roller means are supported on said elongated member.

5. A conveyor according to claim 3, wherein said elongated member has one edge thereof connected to said channel-like structure by a hinge which extends longitudinally of said conveyor, whereby inflation of said conduit causes upward swinging movement of said elongated member, said frame means also including an elongated support frame disposed adjacent and extending longitudinally along said other side of said conveyor, said support frame having a plurality of vertically elongated guide slots formed therein and spaced longitudinally thereof, said roller means having said other axial ends thereof projecting through said elongated slots, and said elongated member having the free edge thereof disposed in engagement with the projecting ends of said roller means so that upward pivoting movement of said elongated member causes upward lifting of said other axial end of said roller means.

6. A conveyor according to claim 5, wherein said frame means includes a further elongated support frame disposed adjacent said one side of said conveyor and extending longitudinally thereof, said roller means having said one axial end thereof supported on said further support frame by means which permit said roller means to vertically pivot between said raised and lowered positions about said other support frame.

7. A conveyor according to claim 2, wherein said frame means includes an elongated frame member disposed adjacent said one side of said conveyor and extending longitudinally thereof, said support means including an elongated support member disposed adjacent said one side of said conveyor and extending longitudinally thereof, said support member having said one axial end of said plurality of roller means supported thereon, said support means also including connecting means coacting between said support member and said frame member for permitting relative pivoting movement therebetween about an axis disposed adjacent said one side of said conveyor and extending in the longitudinal direction of said conveyor, said connecting means defining a hinge due to the coaction between said frame member and said support member.

8. A conveyor according to claim 7, wherein said elongated frame member has an upper curved surface thereon which is convex in a direction transverse of the conveyor so as to permit said support member, which is supported on and in engagement with said convex surface, to pivot with respect to said frame means due to the lifting and lowering of the other axial ends of said roller means by said lifting means.

9. A conveyor according to claim 1, wherein said lifting means causes a pivoting movement of said roller means within vertical planes through an angle of no more than 2° when the rollers are moved between said raised and lowered positions.

10. In a fail-safe, gravity-type roller conveyor for permitting intermittent controlled movement of articles therealong, comprising:
elongated frame means;
a plurality of elongated cylindrical roller means rotatably supported on said frame means, said roller means being disposed with their axes extending substantially horizontally and in spaced parallel relationship, said roller means having their upper surfaces disposed on a declining plane which extends at a small acute angle relative to the horizontal so as to permit said articles to move by gravity along said plurality of roller means;
braking means for controlling the gravity-induced movement speed of said articles along said plurality of roller means, said braking means being fixed relative to and extending longitudinally along said frame means;
support means for supporting said plurality of roller means at one axial end thereof for permitting angular displacement of said plurality of roller means in a vertical direction substantially about said one axial end;
lifting means coacting between said frame means and said plurality of roller means for causing intermittent and periodic vertical reciprocating movement of said other axial end of said plurality of roller means in a cyclic manner between a raised position permitting gravity-urged movement of the articles along said roller means and a lowered position wherein said articles are stopped by said braking means, said lifting means causing said roller means to effectively vertically pivot about said one axial end thereof as defined by said support means, said lifting means also causing said roller means to automatically move into said lowered position upon failure of said lifting means so that said braking means stop said articles; and
control means operatively interconnected to said lifting means for causing cyclic actuation thereof to cause said roller means to vertically pivot back-and-forth between said raised and lowered positions in a periodic and repetitive manner.

11. A conveyor according to claim 10, wherein said lifting means causes a pivoting movement of said roller means within vertical planes through a maximum angle of approximately 2° when the rollers are moved between said raised and lowered positions.

12. A conveyor according to claim 11, wherein the pivoting movement of said roller means occurs through an angle which extends both above and below a horizontal plane.

* * * * *